US006721322B1

(12) United States Patent
Lakhani et al.

(10) Patent No.: US 6,721,322 B1
(45) Date of Patent: Apr. 13, 2004

(54) SYSTEM AND METHOD FOR ESTABLISHING DYNAMIC HIGH USAGE TRUNK GROUPS

(75) Inventors: Faizel Lakhani, Kanata (CA); Dany Sylvain, Gatineau (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/192,530

(22) Filed: Nov. 17, 1998

(30) Foreign Application Priority Data

Oct. 8, 1998 (CA) ............................................. 2249858

(51) Int. Cl.[7] ............................................. H04L 12/28
(52) U.S. Cl. ....................................... 370/395; 370/352
(58) Field of Search ................................ 370/352, 353, 370/354, 355, 395.1, 395.2, 395.21, 395.31, 395.41, 395.5, 395.51, 395.52, 395.6, 400

(56) References Cited

U.S. PATENT DOCUMENTS 5,737,312 A * 4/1998 Sasagawa ................... 370/232
5,949,756 A * 9/1999 Kienberger et al. ......... 370/232
6,195,714 B1 * 2/2001 Li et al. ....................... 710/31

* cited by examiner

*Primary Examiner*—Wellington Chin
*Assistant Examiner*—Brenda Pham
(74) *Attorney, Agent, or Firm*—Withrow & Terranova, PLLC (57) ABSTRACT

The present invention relates to a system and method for provisioning dynamic high usage trunk groups between end offices in a switched telephone network. The system includes a transit trunk subnetwork with ATM facilities connected between the end offices. A call manager communicates with the end offices and the ATM facilities to process signal messages from the end offices, and send corresponding messages to interfaces between the end offices and ATM facilities. The interfaces are configured to dynamically set up and release switched virtual circuits in response to signal messages from the end offices or the call manager. In an alternate embodiment of the invention, an element manager in the end offices is configured to receive signal messages from the call manager to dynamically provision high usage trunks between the end offices.

38 Claims, 4 Drawing Sheets

SYSTEM AND METHOD FOR ESTABLISHING DYNAMIC HIGH USAGE TRUNK GROUPS

FIELD OF THE INVENTION

The present invention relates to provisioning for interoffice traffic in switched telephone networks, and in particular, to a system and method for provisioning dynamic high usage trunk groups between end offices in a switched telephone network.

BACKGROUND OF THE INVENTION

Bearer traffic in a switched telephone network may be characterized as intraoffice traffic, interoffice traffic and interexchange traffic. Intraoffice traffic is traffic that originates and terminates in an end office. Interoffice traffic is traffic that originates in an end office and terminates in another end office in the same exchange. Interexchange traffic is traffic that originates at an end office in one exchange and terminates in an end office in another exchange. Interexchange traffic is routed through one or more tandem switches before it reaches a terminating end office.

Interoffice traffic may also be routed through a tandem switch, but where traffic volume warrants, it is much more efficient to provision direct trunk links between the end offices. These direct trunk links are referred to as high usage trunk groups. Although high usage trunk groups are less costly to provision and maintain than tandem trunk groups they do have one distinct disadvantage. Interoffice traffic volume generally fluctuates considerably, often in a substantially cyclic pattern. Peak traffic periods may be quite high, especially with the current exponential growth in demand for access to the Internet using switched telephone facilities. In order to meet customer expectations, telephone service providers must provision their high usage trunk groups to accommodate most calls during peak usage periods. Not only is such provisioning expensive, much of the high usage trunk group capacity may be idle a large part of the time. Due to the nature of switched telephone trunks, however, the idle capacity of high usage trunk groups cannot be used for other purposes. Consequently, there is a recognized need for a method and system which permits interoffice facilities to be used dynamically so that not only are facilities available to serve all calls during peak usage periods, but the facilities are available for other services during off-peak hours.

There has been considerable recent interest in using asynchronous transfer mode (ATM) backbone networks for the transfer of switched telephone traffic to increase network capacity. Several different systems for accomplishing this have been invented, including Applicant's co-pending patent application entitled TRANSIT TRUNK SUBNETWORK filed Sep. 23, 1998, and assigned application Ser. No. 09/158,855.

A transit trunk subnetwork has several distinct advantages over switched telephone network facilities when utilized as described in the above-referenced patent application. For example, the ATM backbone resources in the network can be dynamically allocated to serve calls as required. During low usage periods, the ATM backbone resources can be used for other purposes such as data transfer to other networks. Since the transit trunk subnetwork is a multipurpose network, the cost of overhead and maintenance is distributed over a broader user base and per unit usage costs are correspondingly reduced.

Furthermore, in view of the advances in ATM backbone networks it has now been recognized that the provisioning and management of switched telephone trunks is quite expensive and contributes significantly to the operating overhead of telephone service providers. There therefore exists a need for a method of organizing switched telephone trunk facilities at the switch level that minimizes the maintenance overhead for those facilities to enable telephone service providers to remain competitive as other service offerings such as Voice Over Internet Protocol (VOIP), for example, are developed.

SUMMARY OF THE INVENTION

It is an object of the present invention to provide interoffice facilities which can be used dynamically, so that such facilities are available for interoffice calls during peak usage periods, and available for other services, such as data transport during off-peak usage periods.

It is another object of the present invention to provide interoffice facilities which are lower in cost to provision and maintain than conventional high usage trunk groups.

The present invention therefore provides an apparatus for providing dynamic high usage trunk groups between first and second end offices using switched virtual circuits (SVCs). The apparatus includes asynchronous transfer mode (ATM) facilities located between the first and second end offices, and interfaces interconnecting the first and second end offices with the ATM facilities. The first and second interfaces are adapted to convert pulse code modulated (PCM) data to ATM cells and vice versa. The first and second interfaces are also adapted to dynamically establish SVCs across the ATM facilities to serve as high usage trunk groups.

The invention further provides an apparatus for providing dynamic high usage trunk groups between first and second end offices in a switched telephone network using switched virtual circuit (SVC) connections established across asynchronous transfer mode (ATM) facilities. The apparatus includes first and second interfaces interconnecting the first and second end offices with the ATM facilities. The first and second interfaces are adapted to convert pulse code modulated (PCM) data to ATM cells and vice versa, and to establish SVC connections across the ATM facilities. The apparatus also includes a signaling controller for receiving call control messages from the end offices and for extracting call control information from the call control messages. The apparatus further includes a call manager for receiving the call control information from the signaling controller and for sending messages to the interfaces in order to dynamically control the establishment of SVCs between the first and second interfaces, in response to the call control information.

The invention also provides a method for controlling high usage trunk group capacity between first and second end offices in a telephone network having asynchronous transfer mode (ATM) facilities and first and second interfaces interconnecting the first and second end offices with the ATM facilities. The method comprises the steps of: dynamically establishing switched virtual circuits (SVCs) across said ATM facilities in response to calls originating from one of said interfaces in one of said first and second end offices and terminating in an interface in the other of said end offices.

The invention further provides an apparatus for dynamic control of trunks between first and second end offices. The apparatus includes asynchronous transfer mode (ATM) facilities located between first and second end offices, with a first interface connected to the first end office and a second interface connected to the second end office. The interfaces are adapted to convert pulse code modulated (PCM) data to ATM cells and vice versa, and are adapted to establish switched virtual circuits (SVCs) across the ATM facilities to serve as high usage trunk groups. The first and second end offices are adapted to receive trunk provisioning messages and are adapted to dynamically increase or decrease provisioning of high usage trunks in response to the trunk provisioning messages.

The invention further provides a method for dynamically controlling high usage trunk group provisioning between first and second end offices in a telephone network using asynchronous transfer mode (ATM) facilities having first and second interfaces interconnecting the first and second end offices with the ATM facilities. The method comprises the steps of: dynamically provisioning trunks between each of the first and second end offices and the interfaces; and, dynamically establishing switched virtual circuits (SVCs) from the first and second interfaces across the ATM facilities in response to the dynamic provisioning of trunks between each of the end offices.

The invention also provides a method of determining the number of SVCs required in a high usage group based on statistics captured by the call manager in response to requests for call completions between a pair of end offices. In accordance with the method, the call request statistics are analyzed at an end of a statistics capturing period and, if necessary, the number of trunks and corresponding SVCs in the high usage group between the end offices is adjusted accordingly. In practice, if at least a first predetermined number of requests for call completions between the two offices are received by the call manager, this indicates that there are too few trunks and corresponding SVCs in the high usage group because overflow calls are being "tandemed" through the call manager. Accordingly, the call manager formulates and sends control messages to the respective end offices, instructing the end offices to provision a specified number of additional trunks in the high usage trunk group. If the number of call requests is less than or equal to a second predetermined number, the call manager formulates and sends control messages to the respective pair of end offices instructing the end offices to remove a specified number of SVCs from the high usage trunk group. The end offices or the call manager subsequently formulate control messages which are sent to the corresponding interfaces instructing the interfaces to set up or release a corresponding number of SVCs. Thus, high usage trunk and SVC management becomes an automated centralized process which is self-governing. By tuning a high usage trunk/SVC provisioning and de-processing increment and a length of the statistics capturing period, efficient high usage groups are dynamically maintained.

DETAILED DESCRIPTION OF THE PREFERRED EMBODIMENTS

This invention relates to a method and apparatus for establishing dynamic high usage trunk groups between end offices in a switched telephone network. The method and apparatus may be used to replace prior art high usage trunk groups, which are static hard wired facilities that interconnect end offices where interoffice traffic volumes warrant.

Figure 1:
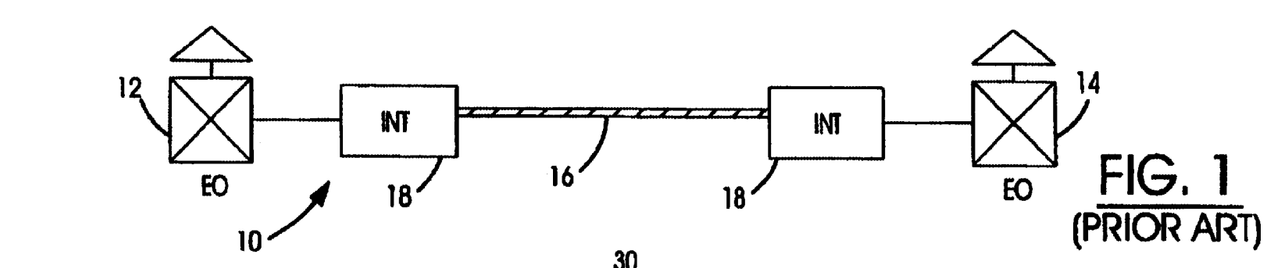
FIG. 1 is a schematic diagram illustrating conventional end offices in a telephone network interconnected by a prior art high usage trunk group.

FIG. 1 shows a portion of a switched telephone network 10 in which a pair of end offices 12 and 14 are interconnected by a high usage trunk group 16. As is well known in the art, each of the end offices 12, 14 includes a trunk interface 18, typically a line card, which terminates respective ends of the high usage trunk group 16. As will be further understood by those skilled in the art, a plurality of interfaces 18 may be used to terminate the trunks in the high usage trunk groups 16, depending on the size of the high usage trunk group 16. High usage trunk groups 16 are commonly used in the switched telephone network 10 where interoffice traffic volume warrants.

Figure 2:
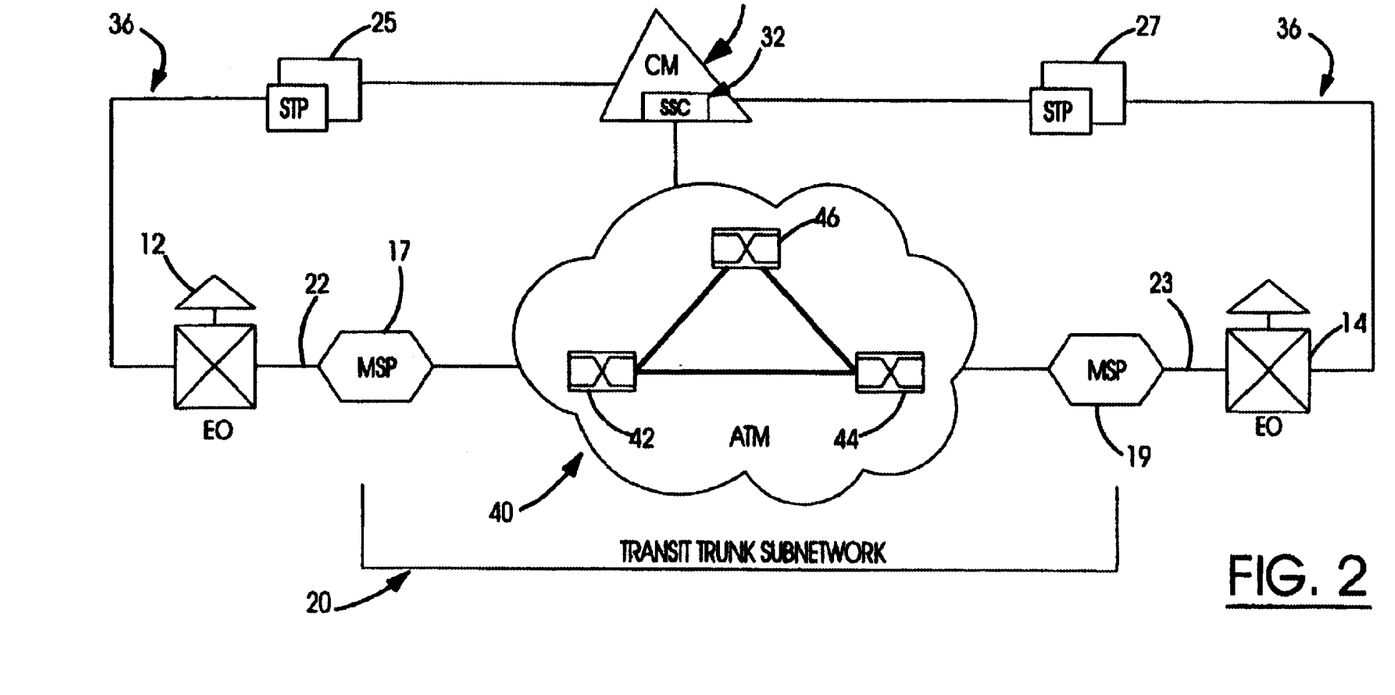
FIG. 2 is a schematic diagram illustrating a preferred embodiment of apparatus for providing dynamic high usage trunk groups between end offices using ATM network facilities.

FIG. 2 is a schematic diagram of an apparatus in accordance with the invention for providing dynamic high usage trunk groups between end offices in a public switched telephone network. The apparatus includes a transit trunk subnetwork generally indicated by reference 20. The transit trunk: subnetwork 20 includes an asynchronous transfer mode (ATM) network 40, which includes ATM switches 42, 44 and 46 which are interconnected in a manner well known to the person of ordinary skill in the art. The transit trunk subnetwork 20 also includes a call manager 30 and a subnetwork signaling controller (SSC) 32. The call manager 30 and the SSC 32 are software programs which are preferably implemented on servers connected to the ATM fabric of the transit trunk subnetwork 20. The call manager 30 of the SSC 32 may be co-located on the same server or implemented on separate servers. The transit trunk subnetwork 20 serves a plurality of end offices 12 and 14, identical to the end offices shown in FIG. 1. Each end office requires an interface 17, 19 to the ATM network 40. The interfaces, which are referred to as Multi-Services Platforms (MSP), will hereinafter be referred to simply as MSPs 17 and 19. The MSPs 17 and 19 provide access to the ATM network by synchronous transfer mode (STM) switches, such as the end offices 12 and 14. They also may be equipped to provide access to the transit trunk subnetwork 20 by other services such as IP gateways (not illustrated) and other data networks. Each MSP 17, 19 is connected to an end office by at least one trunk group 22, 23 as will be explained below in more detail.

Although the diagram of FIG. 2 illustrates only two end offices 12 and 14, and two trunk groups 22, 23, it is understood that high usage trunk groups may exist between any number of different end offices in a switched telephone network. The construction and operation of the transit trunk subnetwork 20 is more fully described in Applicant's co-pending United States patent application entitled TRANSIT TRUNK SUBNETWORK which was filed on Sep. 23, 1998, and assigned application Ser. No. 09/158,855, the entire specification of which is incorporated herein by reference.

FIG. 2 also illustrates the signaling and bearer traffic connections between end offices 12 and 14. For the purposes of illustration only the dynamic high usage trunk groups established between the end offices 12 and 14 will be discussed.

The end offices 12 and 14 are interconnected by a signaling network commonly referred to as a "common channel signaling network". The common channel signaling network includes common channel signaling links 36 which connect the respective end offices 12, 14 with signal transfer points (STPs) 25, 27 in a manner well known in the art. The signaling links 36 enable the end offices 12 and 14 to exchange call control messages during call setup and call release. The call control messages are normally sent in Signaling System 7 (SS7) format which is the signaling protocol most widely implemented in the PSTN. In accordance with this embodiment of the invention, the call manager 30 and SSC 32 are also connected to the common channel signaling network by a signaling links 36. Consequently, the call manager 30 is enabled to send and receive SS7 call control messages over the signaling links 36, as will be explained below in more detail. The MSPs 17 and 19 are connected to the respective end offices by trunks 22 and 23 respectively. The trunks 22 and 23 may be single large trunk groups which have the advantage of reducing maintenance overhead at the respective end offices 12, 14. It will be understood by those skilled in the art that the trunks 22 and 23 need not, however, be single large trunk groups and any number of smaller trunk groups may be used for the same purpose. It will also be understood by those skilled in the art that the trunks 22 and 23 connecting the respective end offices 12, 14 to the MSPs 17, 19 need not be reserved for interoffice call use. Depending on the implementation and the degree of diversion of bearer traffic to the transit trunk subnetwork 20, any portion of the bearer traffic generated at either of the respective end offices 12, 14 may be directed over the respective trunks 22, 23. This invention relates, however, to use of the transit trunk subnetwork 20 for the establishment of dynamic high usage trunk groups between end offices and other uses of the transit trunk subnetwork would be known and understood by the person of ordinary skill in the art.

In order to minimize the impact of transition from prior art high usage trunk groups to dynamic high usage trunk groups in accordance with the invention, it is preferable that the impact on the respective end offices 12, 14 be minimal. Consequently, this embodiment of the invention is configured so that the transit trunk subnetwork is entirely transparent to the end offices 12, 14. For calls to be routed from end office 12 to end office 14 or vice versa, the translation tables in the respective end offices are modified so that the SS7 messages related to those calls are routed via STP 25 to the SSC 32. On receipt of an SS7 message, the SSC 32 extracts the data from the message and passes the data to the call manager 30. The method used for passing data from the SSC 32 to the call manager 30 depends on the implementation of those two functional elements. For example, the data may be passed over an internal bus. The data may likewise be packed into ATM cells and passed through the ATM network 40 to the call manager 30. In either case, on receipt of the data, the call manager analyzes the contents of the common channel signaling message and determines the actions required. Typically, on receipt of an SS7 call control message, the call manager 30 is required to amend the message to ensure that it is forwarded to its destination. The call manager 30 will also be required to send messages through the ATM network to one or both MSPs 17, 19 in response to receipt of a SS7 call control message. All SS7 message signaling is handled by the SSC 32 on instruction from the call manager 30, as will be explained in detail with reference to the walk through illustrated in FIG. 3.

The call manager 30 amends the routing instructions for the call contained in the SS7 signaling message sent from the end office 12 to the SSC 32. Once the routing instructions have been amended by the call manager 30, the amended instructions are sent from the SSC 32, through the ATM network 40 to the MSPs 17 and 19 to begin setting up a switched virtual circuits (SVCs) across endpoints of the ATM network 40. The SVCs established across the ATM network 40 can be established for each call, and released upon termination of the call. Thus, the resources of the ATM network 40 are utilized as needed, and are not strictly dedicated to the requirements of the end offices 12 and 14. When call volumes are low, the ATM network 40 can handle the call volume and devote most of the remaining network resources to other services, such as data transport. When call volumes increase, the ATM network 40 has the capacity to support more SVCs, and divert its resources to the establishment of SVCs through peak calling hours. As the call volume then decreases again, the SVCs in the ATM network can be released as high usage trunk demand permits.

Another feature of the present invention is the establishment of SVC caches in the ATM network 40. SVCs can be established for each call in response to signal messages from the call manager 30, or can be drawn from a cache of SVCs preestablished in the ATM network. The cache of SVCs may either be permanently established, or established during certain periods of time, such as during peak calling hours.

Figure 3:
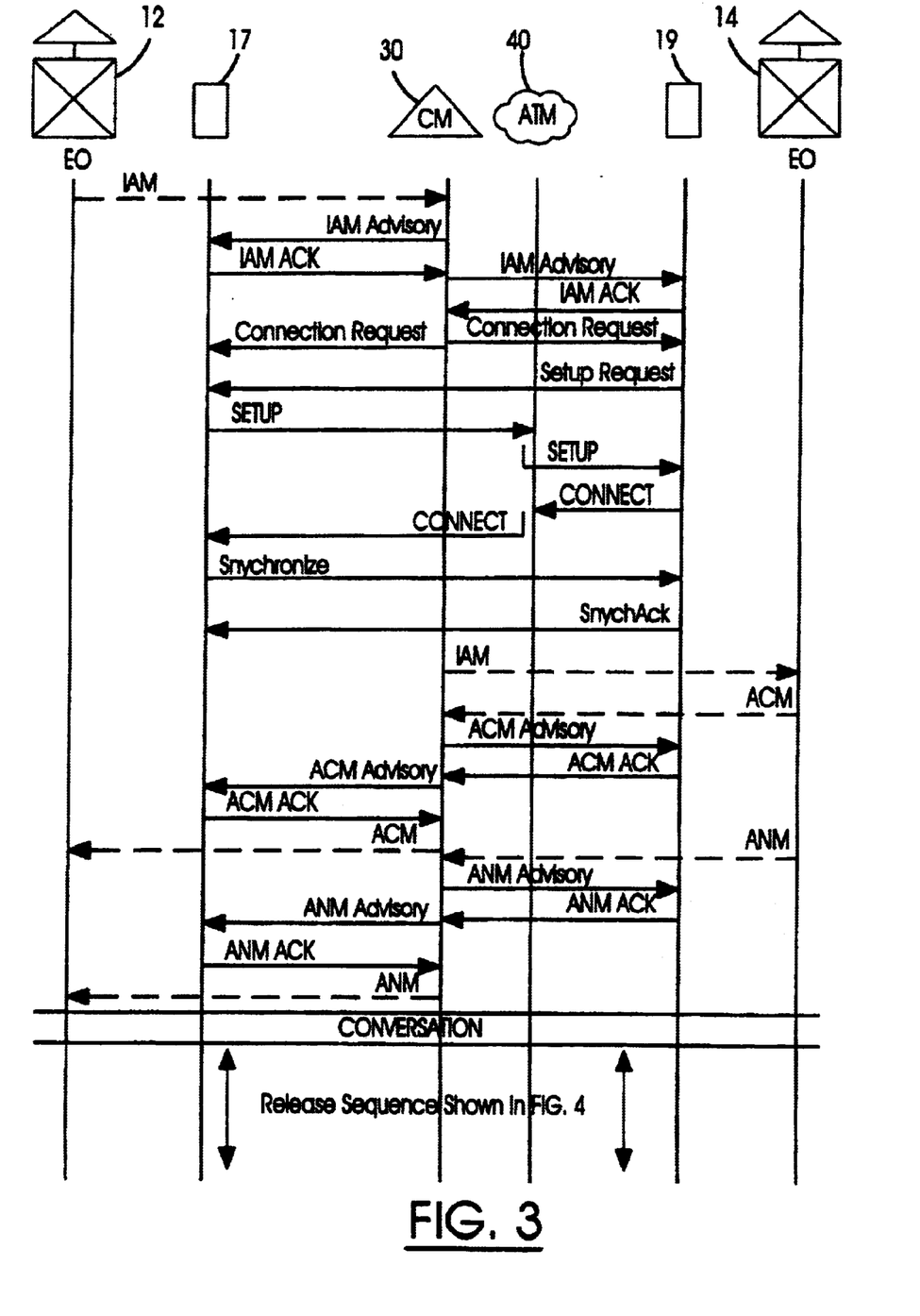
FIG. 3 is a call walk-through diagram for an interoffice call between the first and second end offices using the ATM facilities as shown in FIG. 2.

FIG. 3 illustrates a call walk through diagram for the transit trunk subnetwork as shown in FIG. 2. This figure illustrates the signaling sequence for connection setup using SVCs when a connection request originates at an end office. For purposes of example, it is assumed that the ATM network 40 is connected to an associated call manager 30 which transparently manages call connections between the telephone switching offices 12, 14 without direct interaction with the ATM switches.

As shown in FIG. 3, interface 17 serves end office 12 and interface 19 serves end office 14. A call originates at end office 12. In response to the call, the end office 12 formulates an SS7 Initial Address Message (IAM) and forwards the IAM over the SS7 network to the call manager 30. The SSC of the call manager 30 extracts information from the IAM and the call manager 30 determines from the called number that the call should be terminated at end office 14 using terminating interface 19. The call manager 30 uses the information extracted from the IAM to locate the interface to handle the call origination, and sends an IAM advisory message to the originating interface 17. On receipt of the IAM advisory message, the originating interface 17 verifies the availability of resources and responds with an IAM ACK (acknowledge). The call manager 30 then sends an IAM advisory to the terminating interface 19 which performs a verification of the availability of resources and responds with an IAM ACK. Immediately thereafter, call manager 30 sends a connection request message to the interfaces 17 and 19. The connection request message may be sent exclusively to the terminating interface 19, or sent to each of the interfaces 17,19. For reasons that will be understood by those skilled in the art, it is advantageous to effect backward call set up through the ATM network if the ATM network is organized into a plurality of subnetworks, respectively managed by a call manager 30. In that case, a terminating interface 19 has all the information required to set up backward connection through the ATM network, whereas the interface serving the originating switch does not. It should also be noted that depending on the organization of the ATM network 40, backward set up may not be required or advantageous and is not essential to the operation of the invention. In the example shown in FIG. 3, the connection request message is sent to each of the interfaces 17, 19. The connection request message sent to the terminating interface 19 includes:

(1) TDM path ends at interfaces 17 and 19;

(2) end point address of the originating interface 17; and (3) other miscellaneous information.

The connection request message sent to the terminating interface 19 includes:

(1) TDM path ends at interfaces 17, 19;

(2) endpoint address of terminating interface 19; and;

(3) other miscellaneous information.

The terminating interface 19 inserts an OAM cell-setup request in an in-use SVC and a management system at interface 17 (not shown) sets up the new SVC. As shown in FIG. 3, the setup is accomplished by a Setup Request message sent to the ATM network from terminating interface 19. This is followed by an ATM set up message sent from the originating interface 17 to the ATM network 40. The ATM network does the necessary routing and sends an ATM Set up message to the terminating interface 19. The terminating interface 19 responds with a Connect message to the ATM network, which responds by routing an ATM connect message back to the originating interface 17. On receipt of the ATM connect message, the originating interface 17 sends a Synchronize message back to the terminating interface 19. The terminating interface responds to the Synchronize message with a SynchAck message.

Concurrently, the call manager sends an amended IAM to the terminating end office 14. The amended IAM includes: a new Destination Point Code (DPC) which is the DPC of end office 14; a new originating point code (OPC), which is the OPC of the call manager 30; and a new circuit identification code (CIC), which is an available CIC in trunk group 23, as well as other information in the original IAM message. Upon receipt of the IAM, the terminating end office 14 verifies that the called party line is available. The terminating end office 14 then returns an Address Complete Message (ACM) to the call manager 30. On receipt of the ACM message, call manager 30 forwards an ACM advisory message to the respective interfaces 17, 19 and receives an ACM ACK in return. On receipt of the respective ACM ACK messages, the call manager 30 forwards the ACM over the SS7 network to the originating end office 12. When the called party answers, end office 14 formulates an Answer message (ANM) which it forwards over the SS7 network to the call manager 30. As with the ACM message, the call manager responds to the receipt of the ANM message by sending an ANM advisory message to each of the interfaces 17, 19 and receives an ANM ACK in return. Call manager 30 then amends the ANM message and forwards it to the end office 12. Thereafter, conversation ensues across the completed call path.

Figure 4:
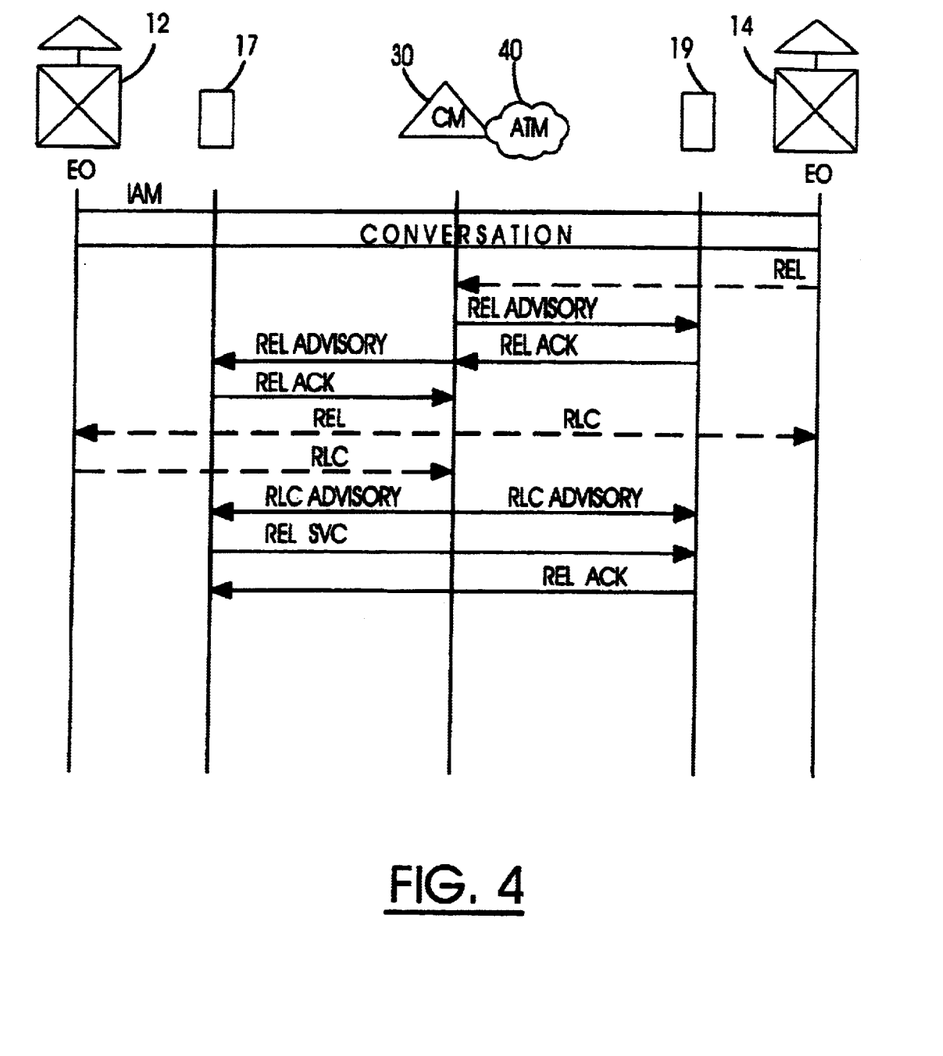
FIG. 4 is a call walk-through diagram for a release of the interoffice call shown in FIG. 3.

FIG. 4 is a call walk-through diagram illustrating the release of a call after being set up using the walk-through procedure of FIG. 3. FIG. 4 illustrates the procedure where the called party goes off-hook first. In this instance an SS7 Release (REL) message is sent from end office 14 to the call manager 30. The call manager 30 responds by sending an REL advisory message to the respective interfaces 17 and 19, and receives REL ACK messages from these interfaces in return. The call manager 30 then amends the REL message and forwards it to the end office 12. The end office 2 returns a Release Complete (RLC) message to the call manager 30, which forwards the RLC message to the end office 14. The call manager 30 then sends RLC Advisory messages to the interfaces 17 and 19. Upon receipt of the RLC Advisory messages, the interface 17 sends a Release SVC message to interface 19, causing the SVC utilized for the call to be released. The interface 19 may then acknowledge, the release of the SVC with a REL ACK message.

Figure 5:
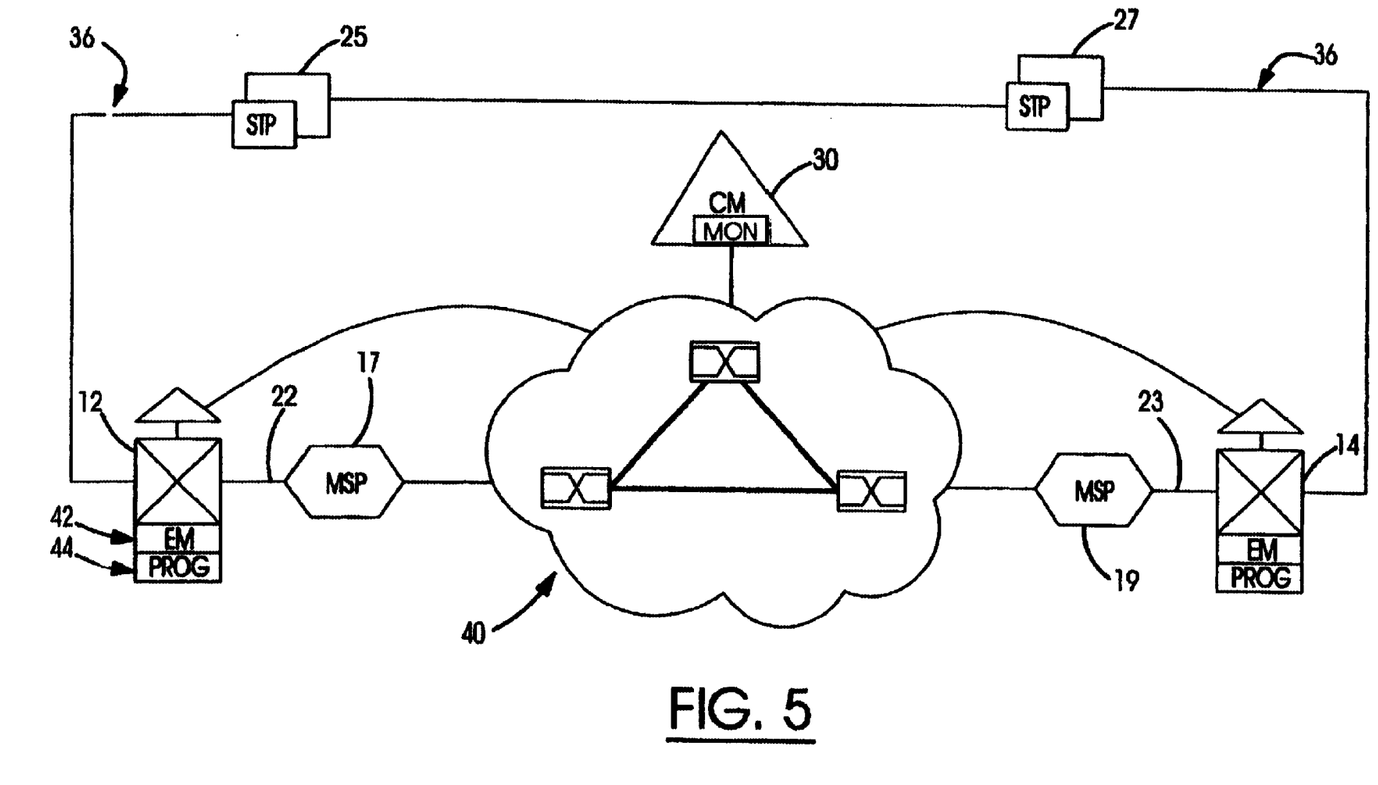
FIG. 5 is a schematic diagram illustrating end offices in a telephone network which are configured to dynamically control the provisioning of high usage trunk groups between the end offices.

FIG. 5 illustrates an embodiment of the invention in which the end offices 12 and 14 are configured to logically provision high usage trunks in a dynamic response to fluctuating call volumes, thereby reducing the call processing load on the call manager 30. High usage groups can be provisioned using a number of different methods. One preferred method consists of enabling the call manager 30 to monitor traffic patterns between pairs of end offices. Consequently, the call manager 30 is provided with a monitoring (MON) function. The monitoring process is readily accomplished by building an A to Z matrix, for example, of originating and terminating ends for each call request served by the call manager 30. At regular intervals, referred to as a "statistics capture interval", the call manager analyzes the captured statistics and determines whether trunks and corresponding SVCs should be added to the high usage groups or removed from the high usage groups. For example, if the call manager has served a plurality of call requests during a last statistics capture interval, the call manager would normally be programmed to send request messages to the respective end offices to prompt them to add a predetermined number trunks to the high usage group that they share. In response, the end offices automatically provision the trunks on their side and send instructions to the respective interfaces to set up matching SVCs between the interfaces. The predetermined number of high usage trunks/SVCs to be added during an increment can be determined in many ways and may be, for example, dependent of such factors as rate of increase, time of day, day of week, etc.

Conversely, unused high usage group trunks/SVCs must be released to ensure efficient use of resources. Consequently, if the number of call requests handled by the call manager 30 during one or more statistics capture intervals for calls between two end offices is less than or equal a predetermined value, such as zero for example, it is probable that too many high usage trunks have been provisioned. In that instance, the call manager 30 would normally be programmed to send messages to the two end offices to instruct that a predetermined number of high usage trunks/SVCs in the high usage trunk group be released. The number of trunks/SVCs to be released may likewise be determined using a number of methods including, rate of decrease, time of day, day of week, etc.

Another preferred method of provisioning high sage trunk groups 22, 23 between the respective end offices 12, 14 and the corresponding MSPs 17, 19 is to provision the high usage trunk groups so that they have adequate capacity to handle peak interoffice traffic loads. However, the end offices are programmed to monitor the high usage trunk traffic and report to the call manager 30, which controls the end offices 12, 14 to logically provision or release trunks/SVCs in response to fluctuations in the interoffice traffic.

Each of the end offices include an element manager 42 and a control program 44. The control program 44 is a software system built into each end office that includes a trigger to prompt the element manager 42 to send a status message to the call manager 30 in response to a predetermined condition detected by the control program 44. The call manager 30 may then respond to a status message by sending messages to the end offices 12, 14 to start logical provisioning of more high usage trunks/SVCs, as will be further described below. The predetermined condition detected by the control program may be, for example:

(1) a time of day; (2) a rate of increase or decrease in call volume; or (3) a condition where call volume reaches a predetermined percentage of maximum usage capacity of trunks provisioned between the end offices 12 and 14.

After the control program 44 in one of the end offices detects one of the predetermined conditions, the element manager 42 in that end office sends a status message to the call manager 30 through the ATM network 40. The call manager 30 interprets the status message and may, depending on circumstances, respond by returning trunk provisioning messages through the ATM network 40 to both of the end offices 12 and 14 to start the logical provisioning of high usage trunks. As is well known in the art, the end offices 12 and 14 each include internal tables (not shown) listing the trunks provisioned between the end offices. In response to the trunk provisioning messages, the element manager 42 of the end offices 12 and 14 are programmed to add entries to these tables to logically provision the additional trunks. The additional trunks are preferably provisioned in increments, with an increment being provisioned in response to a trunk provisioning message from the call manager 30. The incremental number of trunks may be, for example, an increment of 10 trunks. However, any number of trunks may be added in an increment and the specific number of trunks added during each increment is a matter of design choice that may be governed by a number of factors. The call manager 30 may, of course, specify a number of trunks to be logically provisioned at any given time.

Once a number of trunks have been provisioned, the end offices 12 and 14 then send control messages to the MSPs 17, 19 to start setting up a corresponding number of SVCs across the ATM network 40. Alternatively, the end offices 12, 14 may return control messages to the call manager 30 which instructs the MSPs 17, 19 to set up corresponding SVCs and map them to the newly provisioned high usage trunks. The MSPs 17, 19 then map those SVCs to the newly provisioned trunks. The arrangement shown in FIG. 5 operates in the same manner when trunks are to be released. The control program 44 at one end office detects a predetermined condition, which triggers the element manager at that end office to send a status message to the call manager 30. The call manager 30 then interprets the status message and sends a trunk provisioning message back to the end offices 12 and 14. This message causes the element managers 42 in the end offices 12 and 14 to delete entries for trunks from its table of provisioned trunks. The element managers 42 thereafter send control messages to the respective MSPs, which release the corresponding SVCs. Alternatively, the element managers return control messages to the call manager 30 which instructs the MSPs to release the corresponding SVCs.

The advantage of the arrangement shown in FIG. 5 is that it permits control over the SVC resource allocation while enabling fast call setup. The SVC resources are allocated as call volume increases, or the call manager 30 anticipates an increased usage period using a predictive algorithm, for example. Likewise, the SVC resources are decreased as call volume decreases, or the call manager 30 anticipates a decrease in inter-office traffic using the predictive algorithm. Therefore, the SVC resources are only used to the extent required, plus a small margin of potential excess capacity, thus dynamically managing resource usage in the ATM network 40 to permit that network to be used for other services as interoffice call volume permits.

The embodiments illustrated and discussed herein are intended to teach those skilled in the art the best mode of the present invention. Nothing in the specification should be considered as limiting the scope of the present invention, but rather as exemplification of preferred embodiments thereof. Many other network topologies, and call walk through procedures may be implemented within the scope of the present invention. Any changes could be made by those skilled in the art to produce equivalent methods and systems without departing from the scope of the present invention. The scope of the invention should be determined not by the embodiments illustrated, but by the appended claims attached hereto and their equivalents.

We claim:

1. An apparatus for providing a dynamic high usage trunk group between first and second end offices using asynchronous transfer mode (ATM) facilities located between first and second end offices, comprising:

first and second interfaces interconnecting the first and second end offices with said ATM facilities said first and second interfaces being adapted to convert Pulse code modulated (PCM) data to ATM cells and vice versa, and adapted to dynamically establish SVCs across the ATM facilities to provide a direct link between the first and second end offices for serving as a high usage trunk group; and call manager for receiving call control messages from said first and second end offices, said call manager being further adapted to extract call control information from said call control messages and send messages to said interfaces in order to dynamically control establishment of the SVCs between said first and second interfaces.

2. The apparatus as claimed in claim 1, wherein said call manager includes a processing system adapted to interpret call control information, and further adapted to amend said call control information and forward said amended call control information to an appropriate one of said first and second end offices.

3. The apparatus as claimed in claim 2, wherein said processing system includes a look up table which includes information used to amend said call control information.

4. The apparatus as claimed in claim 1, wherein said apparatus further includes a signal controller for receiving call control messages from said first and second end offices and extracting call control information from said call control messages, and a call manager fro receiving the call control information from the signal controller and for formulating messages to be sent to the first and second interfaces.

5. The apparatus as claimed in claim 4, wherein said signaling controller and call manager operate on a single platform.

6. The apparatus as claimed in claim 4, wherein said signaling controller and call manager operate on different platforms.

7. Apparatus for providing dynamic high usage trunk groups between first and second end offices in a switched telephone network using switched virtual circuit (SVC) connections established across asynchronous transfer mode (ATM) facilities, comprising:

first and second interfaces interconnecting the first: and second end offices with the ATM facilities, the first and second interfaces being adapted to convert pulse code modulated (PCM) data to ATM cells and vice versa and to establish SVC connections across the ATM facilities;

a signaling controller for receiving call control messages from the end offices and for extracting call control information from the call control messages, and;

a call manager for receiving the call control information from the signaling controller and for formulating messages to be sent to the interfaces in order to dynamically control establishment of SVCs between first and second interfaces in response to the call control information, tile SVCs being used to serve as a high usage trunk group between first and second end offices.

8. The apparatus as claimed in claim 7, wherein each of the first and second end offices are configured to address call control messages to the signal controller.

9. The apparatus as claimed in claim 7, wherein said signal controller and call manager operate on the same platform.

10. The apparatus as claimed in claim 7, wherein said signal controller and call manager operate on different platforms.

11. The apparatus as claimed in claim 7, wherein said call manager includes a processing system adapted to interpret said call control information and farther adapted to amend said call control information and return said amended call control information to said signaling controller, which forwards said amended call control information in call control messages to an appropriate one of said first and second interfaces.

12. The apparatus as claimed in claim 11, wherein said processing system includes a look up table which includes information used to amend said call control system.

13. A method for dynamically controlling high usage group capacity between first and second end offices in a telephone network using asynchronous transfer mode (ATM) facilities and first and second interfaces interconnecting the first and second end offices with said ATM facilities, comprising the steps of:

receiving at a call manager associated with the telephone network and the ATM facilities, a call completion request from one of the first and second end offices requesting completion of a call to the other of the first and second end offices and sending instructions from the call manager to said first and second interfaces to dynamically establish a switched virtual circuit (SVC) across said ATM facilities to provide a direct link between the first and second end offices; and dynamically establishing the switched circuit from a one of said first and second interfaces across said ATM facilities to the other of said first and second interfaces in response to the instructions received from the call manager, to dynamically control the high usage trunk group capacity.

14. The method as claimed in claim 13, further comprising the steps of:

(i) routing an initial address message (IAM) from said first end office to said call manager;

(ii) extracting call information from said IAM and editing said call information;

(iii) inserting said edited call information into a second IAM and routing said second IAM to said second end office;

(iv) sending control messages from said call manger to said first and second interfaces to establish an SVC across said ATM facilities.

15. The method as claimed in claim 14, wherein said control messages are fabric control messages.

16. The method as claimed in claim 14, wherein said method further includes the step of:

sending a management message from said first interface to said second interface with information to permit mapping of an SVC to a trunk which is designated to serve the call.

17. The method as claimed in claim 16, wherein said management message is an Operation-Administration-and-Management cell.

18. The method as claimed in claim 16, wherein the method further includes the step of:

sending a reply message to acknowledge receipt of the management message.

19. An apparatus for providing dynamic control of trunk between first and second end offices using asynchronous transfer mode (ATM) facilities located between said first and second end offices, comprising:

a first interface interconnecting the first end office with the ATM facilities and a second interface interconnecting the second end office with the ATM facilities, said first and second interfaces being adapted to convert pulse code modulated (PCM) data to ATM cells and vice versa, and adapted to establish switched virtual circuits (SVCs) across the ATM facilities to serve as high usage trunk groups; and first and second end offices adapted to receive trunk provisioning messages and dynamically increase or decrease provisioning of high usage trunks in response to said trunk provisioning messages.

20. The apparatus as claimed in claim 19, wherein said apparatus further includes a call manager and said first and second end offices are adapted to send status messages to said call manager when a predetermined condition is detected.

21. The apparatus as claimed in claim 20, wherein said call manager is configured to receive and interpret said status messages and send the trunk provisioning messages to said first and second end offices in response to the status messages.

22. The apparatus as claimed in claim 21, wherein said predetermined condition is a rite of increase in call volume, rate of decrease in call volume, time of day or day of week.

23. The apparatus as claimed in claim 20, wherein said predetermined condition exists when call volume reaches a predetermined percentage of maximum usage capacity on trunks provisioned between said first end office and said second end office.

24. The apparatus as claimed in claim 20, wherein said predetermined condition is detected by a program associated with the call manager.

25. The apparatus as claimed in claim 20, wherein said predetermined condition is detected by a program associated with one of said first and second end offices.

26. The apparatus as claimed in claim 19, wherein said end offices are configured to send control messages to said first and second interfaces to set up or release SVCs in accordance with said dynamic increase or decrease in provisioning of said trunks.

27. The apparatus as claimed in claim 26, wherein said first and second interfaces are configured to map said SVCs to provisioned trunks as the SVCs are created.

28. A method for dynamically controlling trunk provisioning between first and second end offices in a telephone network using asynchronous transfer mode (ATM) facilities having first and second interfaces interconnecting the first and second end offices with said ATM facilities, comprising the steps of:

(i) dynamically provisioning trunks between each of said first and second end offices and said interfaces to provide a dynamic high usage trunk group; and (ii) (dynamically establishing switched virtual circuits (SVCs) from said first and second interfaces across said ATM facilities in response to said dynamic provisioning of trunks between each of said end offices.

29. The method as claimed in claim 28, wherein said network includes a call manager, said method further comprising the steps of:

(i) routing a status message from one of said end offices to said call manager in response to a predetermined condition;

(ii) sending control messages from said call manager to each of said end offices to dynamically provision trunks between each of said first and second end offices and said interfaces.

30. The method as claimed in claim 29, wherein said predetermined condition is a rate of increase in call volume, is a rate of decrease in call volume, a time of day or a day of week.

31. The method as claimed in claim 28, wherein the network includes a call manager that serves call requests for all calls between the first and second end offices that are not routed through the high usage trunk group, and said call manager monitors the number of call requests relating to calls originating in the first end office and terminating in the second end office, or originating in the second end office and terminating in the first end office, and periodically analyzes statistics accumulated during the monitoring to determine whether the number of trunks in the high usage trunk group should be increased or decreased.

32. The method as claimed in claim 29, wherein said predetermined condition exists when call volume reaches a predetermined percentage of maximum usage capacity of trunks provisioned between said first and second end offices.

33. The method as claimed in claim 29, wherein said end office includes a readable table of provisioned trunks, said element manager adding entries for additional trunks to said readable table in response to said control message from said call manager.

34. The method as claimed in claim 33, further comprising the step of:

routing messages from said call manager to each of said first and second interfaces to cause the interfaces to setup SVCs across said ATM network in response to control messages from said call manager.

35. The method as claimed in claim 34, further comprising the step of:

mapping said SVCs to dynamically provisioned trunks.

36. The method as claimed in claim 31, wherein when the call manager determines that the number of trunks in the high usage trunk group should be increased or decreased, the call manager formulates control messages which are sent to the first and second end offices to instruct the end offices to provision or de-provision high usage trunks as required.

37. The method as claimed in claim 36, wherein on receipt of a control message the first and second end offices create entries in a high usage trunk table or delete entries from the table and formulate and send control messages to a corresponding interface to instruct the interface to set up SVCs corresponding to the high usage trunks added to the table or release SVCs corresponding to trunks deleted from the table.

38. The method as claimed in claim 36, wherein the call manager also formulates control messages which are sent to the interfaces that serve the first and second end offices to instruct the interfaces to set up or release SVCs corresponding to high usage trunks.

* * * * *